United States Patent
Bae et al.

(10) Patent No.: US 9,880,624 B2
(45) Date of Patent: Jan. 30, 2018

(54) ELECTRONIC DEVICE AND METHOD FOR PROVIDING INFORMATION THEREOF

(71) Applicant: Samsung Display Co., Ltd., Yongin, Gyeonggi-Do (KR)

(72) Inventors: Jongsung Bae, Hwaseong-si (KR); Chan Young Park, Yongin-si (KR); Donghyeon Lee, Seoul (KR); Jusuck Lee, Seoul (KR); Heesoon Jeong, Hwaseong-si (KR); Seongmin Cho, Seoul (KR); Eunsil Han, Hwaseong-si (KR); Jeongjin Hong, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 272 days.

(21) Appl. No.: 14/589,132

(22) Filed: Jan. 5, 2015

(65) Prior Publication Data

US 2015/0234465 A1 Aug. 20, 2015

(30) Foreign Application Priority Data

Feb. 14, 2014 (KR) .................. 10-2014-0017342
Mar. 24, 2014 (KR) .................. 10-2014-0034192

(51) Int. Cl.
*G06F 3/01* (2006.01)

(52) U.S. Cl.
CPC .... *G06F 3/016* (2013.01); *G06F 2203/04105* (2013.01)

(58) Field of Classification Search
CPC .......... G06F 2203/04105; G06F 3/016; G06F 3/044; G06F 2203/04809; G06F 3/04886; G06F 2203/04103; G06F 3/0412; H01H 2211/002; H01H 2221/038
USPC .................................................. 345/156–180
See application file for complete search history.

(56) References Cited

U.S. PATENT DOCUMENTS

| 5,286,199 A | 2/1994 | Kipke |
| 6,703,924 B2 * | 3/2004 | Tecu .................... G09B 21/003 340/407.1 |
| 8,593,409 B1 | 11/2013 | Heubel et al. |
| 2004/0174374 A1 * | 9/2004 | Ihara ....................... G06F 3/016 345/582 |

(Continued)

FOREIGN PATENT DOCUMENTS

| JP | H06206191 A | 7/1994 |
| JP | 2005055489 A | 3/2005 |

(Continued)

OTHER PUBLICATIONS

English Translation of JP 2005055489 (drawings).*
Ino, et al., Chapter 10, "Human-Centered Metal Hydride Actuator Systems for Rehabilitation and Assistive Technology" Oct. 2010 (Oct. 2010), Medical information science reference, pp. 154-170.

*Primary Examiner* — Hong Zhou
(74) *Attorney, Agent, or Firm* — Cantor Colburn LLP

(57) ABSTRACT

An electronic device includes a pressure providing part, a fluid, and a tactile sensation providing layer. The pressure providing part generates an initial pressure by an electrical signal. The fluid generates a fluidic pressure by the initial pressure in each of active regions partitioned from each other. The tactile sensation providing layer is configured to protrude by the fluidic pressure. The pressure providing layer may include piezoelectric elements mechanically modified by the electrical signal.

19 Claims, 12 Drawing Sheets

(56) References Cited

U.S. PATENT DOCUMENTS

| | | | |
|---|---|---|---|
| 2009/0162707 A1* | 6/2009 | Nakakubo | F16K 99/0001 429/515 |
| 2009/0250267 A1* | 10/2009 | Heubel | G06F 3/041 178/18.03 |
| 2012/0068957 A1* | 3/2012 | Puskarich | G06F 3/016 345/174 |
| 2012/0105333 A1 | 5/2012 | Maschmeyer et al. | |
| 2013/0161164 A1 | 6/2013 | Taka et al. | |
| 2013/0186208 A1 | 7/2013 | Lee et al. | |
| 2014/0125608 A1* | 5/2014 | Murata | G06F 3/041 345/173 |
| 2014/0253687 A1* | 9/2014 | Lee | G06F 3/0488 348/46 |
| 2015/0212578 A1* | 7/2015 | Lor | G06F 3/03545 345/173 |
| 2016/0005277 A1* | 1/2016 | Gwilliam | G06F 3/016 340/407.1 |

FOREIGN PATENT DOCUMENTS

| | | |
|---|---|---|
| JP | 2005078644 A | 3/2005 |
| KR | 1020010017729 A | 3/2001 |
| KR | 1020100046152 A | 5/2010 |
| KR | 1020100118055 A | 11/2010 |
| KR | 1020110118584 A | 10/2011 |
| KR | 101219996 B1 | 1/2013 |
| WO | 2012093725 A1 | 7/2012 |

\* cited by examiner

FIG. 11A

| UR-A | UR-B | UR-C |
|---|---|---|
| UR-D | UR-E | UR-F |
| UR-G | UR-H | UR-I |

| UR-A | UR-B | UR-C |
|---|---|---|
| UR-D | UR-E | UR-F |
| UR-G | UR-H | UR-I |

| UR-A | UR-B | UR-C |
|---|---|---|
| UR-D | UR-E | UR-F |
| UR-G | UR-H | UR-I |

← TS

ELECTRONIC DEVICE AND METHOD FOR PROVIDING INFORMATION THEREOF

This application claims priority to Korean Patent Application No. 10-2014-0017342 filed on Feb. 14, 2014 and Korean Patent Application No. 10-2014-0034192, filed on Mar. 24, 2014, and all the benefits accruing therefrom under 35 U.S.C. § 119, the contents of which in their entireties are herein incorporated by reference.

BACKGROUND

1. Field

Exemplary embodiments of the invention relate to an electronic device and a method for providing information thereof and, more particularly, to an electronic device that provides tactile sensation information and a method for providing information thereof.

2. Description of the Related Art

Display devices provide visual information to a user. The display devices may include a liquid crystal display device, an organic light-emitting display device, and a plasma display device, for example. Generally, a display device may include a flat display panel for displaying an image.

The user recognizes the image displayed from the flat display panel only through the sense of sight but does not recognize the image through the sense of touch.

SUMMARY

Exemplary embodiments of the invention may provide an electronic device that provides tactile sensation information to a user.

Embodiments of the invention may also provide a method for providing information of an electronic device expressing tactile sensation information corresponding to shape information, color information, and gradation information included in image data.

In an exemplary embodiment, an electronic device includes a pressure providing part, a fluid, and a tactile sensation providing layer. In such an embodiment, the pressure providing part may generate an initial pressure in response to an electrical signal, the fluid may generate a fluidic pressure corresponding to the initial pressure in each of active regions partitioned from each other, and the tactile sensation providing layer may be configured to protrude by the fluidic pressure.

In an exemplary embodiment, the pressure providing part may include a plurality of piezoelectric elements disposed in the active regions, and each of the piezoelectric elements may be mechanically modified by the electrical signal.

In an exemplary embodiment, the electronic device may further include: a first electrode connected to one terminal of a piezoelectric element of the piezoelectric elements; and a second electrode connected to another terminal of the piezoelectric element of the piezoelectric elements.

In an exemplary embodiment, the electronic device may further include: a hydrogen storage alloy which absorbs or releases hydrogen according to pressure applied thereto.

In an exemplary embodiment, the electronic device may further include: a substrate; and a partition wall disposed on the substrate and defining the active regions. In such an embodiment, the partition wall may include: a first partition wall disposed between the substrate and the hydrogen storage alloy to define a first space which is sealed; and a second partition wall disposed between the hydrogen storage alloy and the tactile sensation providing layer to define a second space which is sealed.

In an exemplary embodiment, the fluid may include: an inert gas which fills the first space; and hydrogen which fills the second space or stored in the hydrogen storage alloy.

In an alternative exemplary embodiment, the fluid may be liquid.

In an exemplary embodiment, a width of a region of the partition wall may become progressively less toward a bottom of the region.

In an exemplary embodiment, an area of a region exposed by a top of the partition wall may be smaller than an area of a region exposed by a bottom of the partition wall when viewed from a plan view.

In an exemplary embodiment, the electronic device may further include: a protrusion disposed between a surface of the fluid and the tactile sensation providing layer. In such an embodiment, the protrusion may be moved by the fluidic pressure to protrude the tactile sensation providing layer.

In an exemplary embodiment, the electronic device may further include: a driving unit which receives image data, converts the image data into tactile sensation data, and outputs the tactile sensation data to an expressing unit.

In an exemplary embodiment, the expressing unit may express tactile sensation information corresponding to the tactile sensation data and may include the pressure providing part, the fluid, and the tactile sensation providing layer.

In an exemplary embodiment, the driving unit may include a mode selecting part, a height calculating part, a texture calculating part, and a tactile sensation data generating part.

In an exemplary embodiment, the mode selecting part may select at least one of shape information, color information, and gradation information which are included in the image data.

In an exemplary embodiment, the height calculating part may determine heights of unit regions, respectively corresponding to the active regions, of the tactile sensation providing layer.

In an exemplary embodiment, the texture calculating part may determine the number of protruding unit regions among the unit regions of the tactile sensation providing layer to determine a texture of the tactile sensation providing layer.

In an exemplary embodiment, the tactile sensation data generating part may generate the tactile sensation data based on the heights and the texture of the tactile sensation providing layer.

In another exemplary embodiment, a method for providing information of an electronic device may include: selecting at least one of expression related information included in image data; and expressing tactile sensation information corresponding to the selected information by protruding at least a portion of an outer surface of the electronic device.

In an exemplary embodiment, the expression related information of the image data may include shape information, color information, and gradation information.

In an exemplary embodiment, the electronic device may include a plurality of unit regions configured to protrude by signals applied thereto. In such an embodiment, expressing the tactile sensation information may include: expressing the tactile sensation information using heights of the unit regions and the number of protruding unit regions among the plurality of unit regions.

BRIEF DESCRIPTION OF THE DRAWINGS

The above and other feature of the invention will become apparent by describing in further detail exemplary embodiments thereof with reference to the accompanying drawings, in which:

FIGS. 11A to 11C are plan views illustrating an exemplary embodiment of an expressing unit that expresses a color and a gradation based on a texture of a tactile sensation providing layer.

DETAILED DESCRIPTION OF THE EMBODIMENTS

Figure 1:
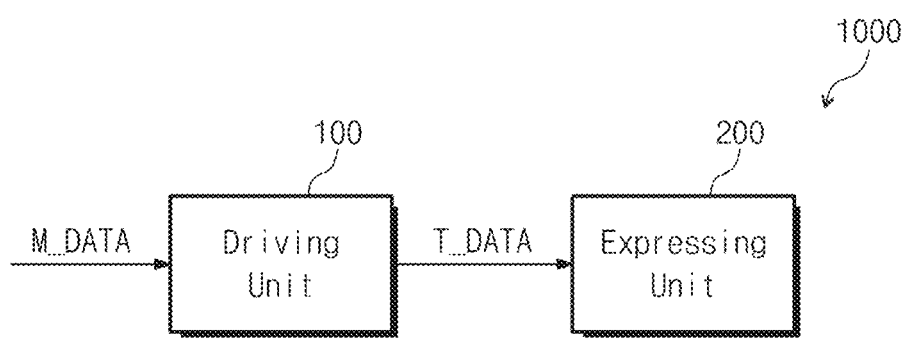
FIG. 1 is a schematic block diagram illustrating an exemplary embodiment of an electronic device according to the invention.

The invention will now be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in further detail with reference to the accompanying drawings.

FIG. 1 is a schematic block diagram illustrating an exemplary embodiment of an electronic device 1000 according to the invention.

Referring to FIG. 1, an exemplary embodiment of the electronic device 1000 includes a driving unit 100 and an expressing unit 200.

The expressing unit 200 is driven by the driving unit 100. The driving unit 100 receives image data M_DATA and converts the image data M_DATA into tactile sensation data T_DATA. The driving unit 100 will be described later in greater detail.

The expressing unit 200 receives the tactile sensation data T_DATA and expresses tactile sensation information corresponding to the tactile sensation data T_DATA. A user may recognize through the tactile sensation information a shape, a color and a gradation that the expressing unit 200 expresses.

Figure 2:
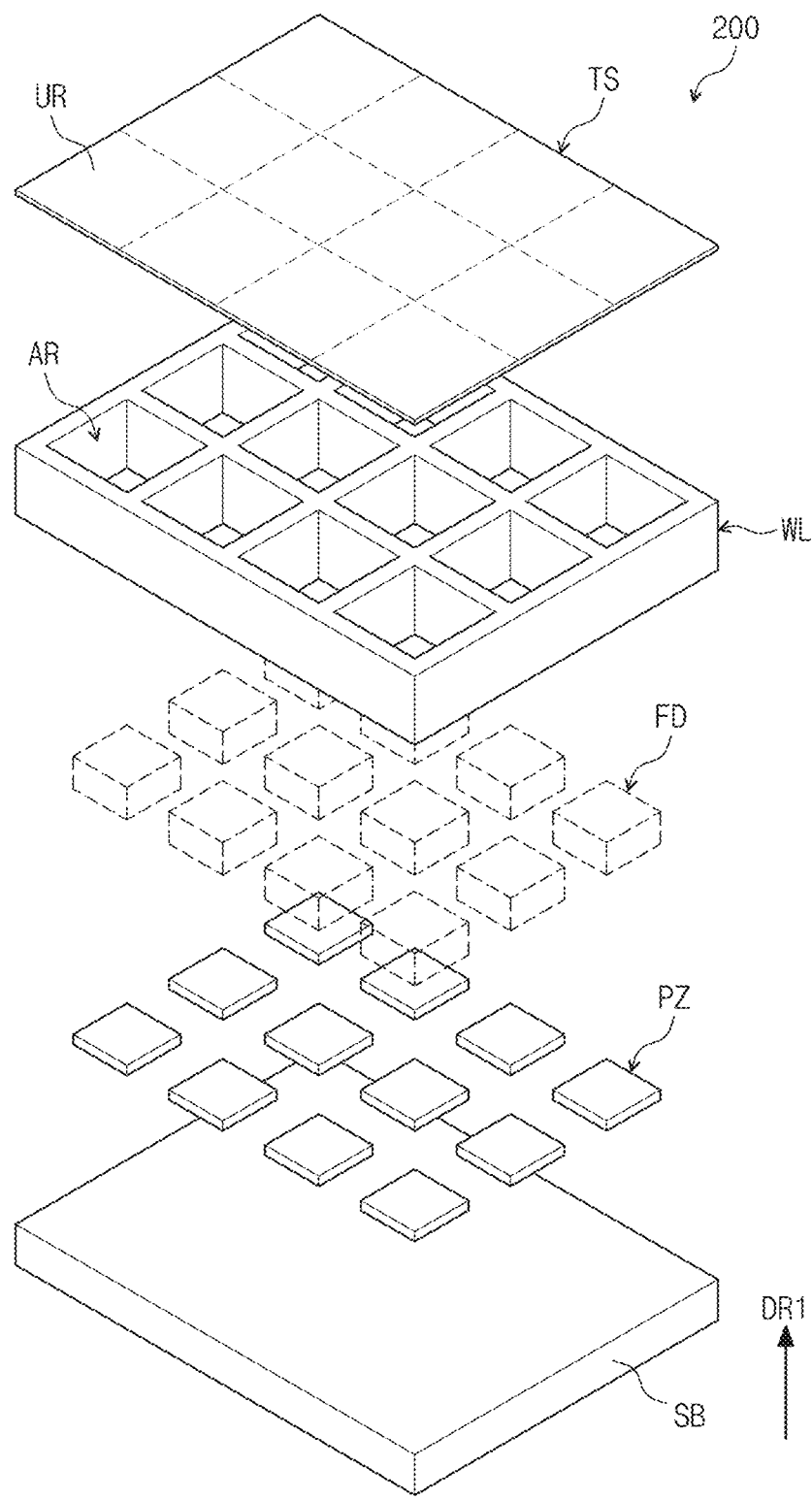
FIG. 2 is an exploded perspective view illustrating an exemplary embodiment of an expressing unit of FIG. 1.

FIG. 2 is an exploded perspective view illustrating an exemplary embodiment of an expressing unit 200 of FIG. 1.

Referring to FIG. 2, an exemplary embodiment of the expressing unit 200 may include a substrate SB, a partition wall WL, and a pressure providing part, a fluid FD, and a tactile sensation providing layer TS.

The substrate SB may be a flat insulating substrate. The substrate SB may include or be formed of glass, plastic or ceramic, for example.

The partition wall WL is disposed on the substrate SB. The partition wall WL defines active regions AR based on partitioned inner spaces defined therein. The active regions AR may be spatially separated from each other by the partition wall WL. The active regions AR may be partitioned substantially in a matrix form.

The pressure providing part may generate initial pressure by an electrical signal. The pressure providing part may include piezoelectric elements PZ.

The piezoelectric elements PZ are disposed on the substrate SB. The piezoelectric elements PZ may be disposed in the active regions AR, respectively. Each of the piezoelectric elements PZ may be mechanically modified by a voltage applied thereto. In an exemplary embodiment, each of the piezoelectric elements PZ may receive a voltage, and a volume of each of the piezoelectric elements PZ may thereby expand substantially in a first direction DR1 substantially perpendicular to a top surface of the substrate SB. The initial pressure may occur substantially in the first direction DR1 by the volume expansion of the piezoelectric elements PZ.

The piezoelectric elements PZ may include or be formed of aluminum orthophosphate ($AlPO_4$), quartz, Rochelle salt, topaz, gallium orthophosphate ($GaPO_4$), lanthanum-gallium silicate ($La_3Ga_5SiO_{14}$), barium titanate ($BaTiO_3$), bismuth titanate ($Bi_4Ti_3O_{12}$), lead titanate ($PbTiO_3$), zinc oxide (ZnO), zirconium-lead titanate ($Pb[Zr_xTi_{1-x}]O_3$, $0<x<1$; PZT), lanthanum-bismuth titanate ($[Bi_{4-x}La_x]Ti_3O_{12}$, $0<x<1$; BLT), tin oxide ($SnO_2$), kalium niobate ($KNbO_3$), lithium niobate ($LiNbO_3$), lithium tantalate ($LiTaO_3$), sodium tungstate ($Na_2WO_3$), sodium-barium niobate ($Ba_2NaNb_5O_5$), kalium-lead niobate ($Pb_2KNb_5O_{15}$), sodium-kalium niobate ($KNaNb_5O_5$), bismuth ferrite ($BiFeO_3$), or a combination thereof.

The fluid FD may be disposed on the piezoelectric elements PZ. The fluid FD may be disposed in each of the active regions AR. The fluid FD may generate a fluidic pressure at an initial pressure. In an exemplary embodiment, the fluid FD may provide the fluidic pressure to the tactile sensation providing layer TS substantially in the first direction DR1 based on the mechanical modification of the piezoelectric element PZ.

The tactile sensation providing layer TS may be disposed on the partition wall WL. The tactile sensation providing layer TS may protrude substantially in the first direction DR1 by the fluidic pressure of the fluid FD. The tactile sensation providing layer TS may include a plurality of unit regions UR respectively corresponding to the active regions AR. The unit regions UR may protrude independently of each other substantially in the first direction DR1 by the fluids FD respectively disposed in the active regions AR.

The tactile sensation providing layer TS may include or be formed of a flexible material. In one exemplary embodiment, for example, the tactile sensation providing layer TS may include or be formed of plastic resin or a polymer film.

The user may recognize the tactile sensation information through the tactile sensation providing layer TS.

Figure 3:
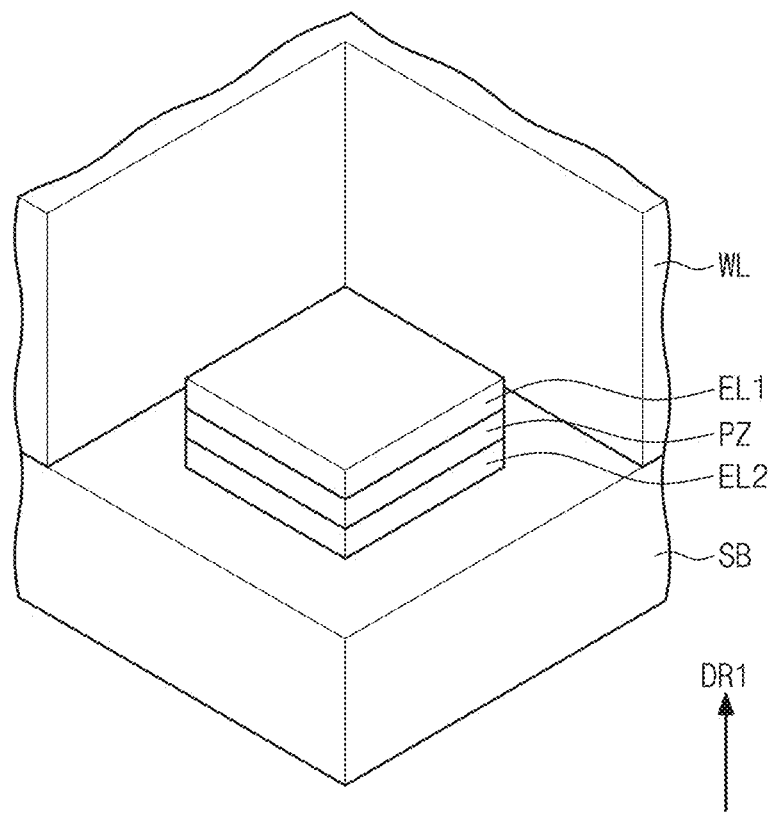
FIGS. 3 to 5 are perspective views illustrating portions of exemplary embodiments of the expressing unit according to the invention.
Figure 4:
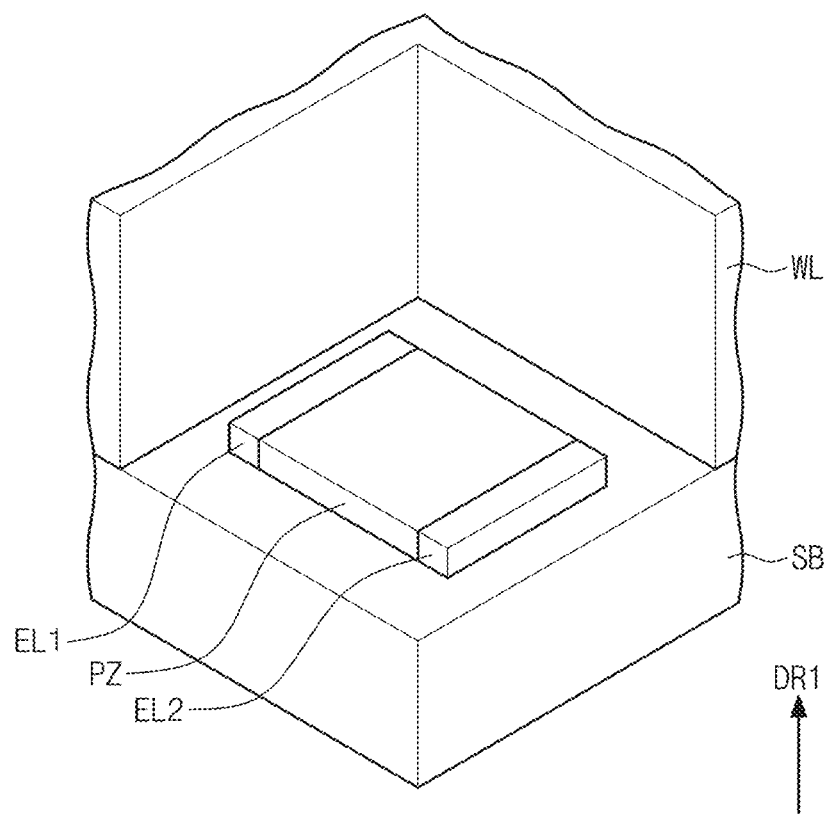
Figure 5:
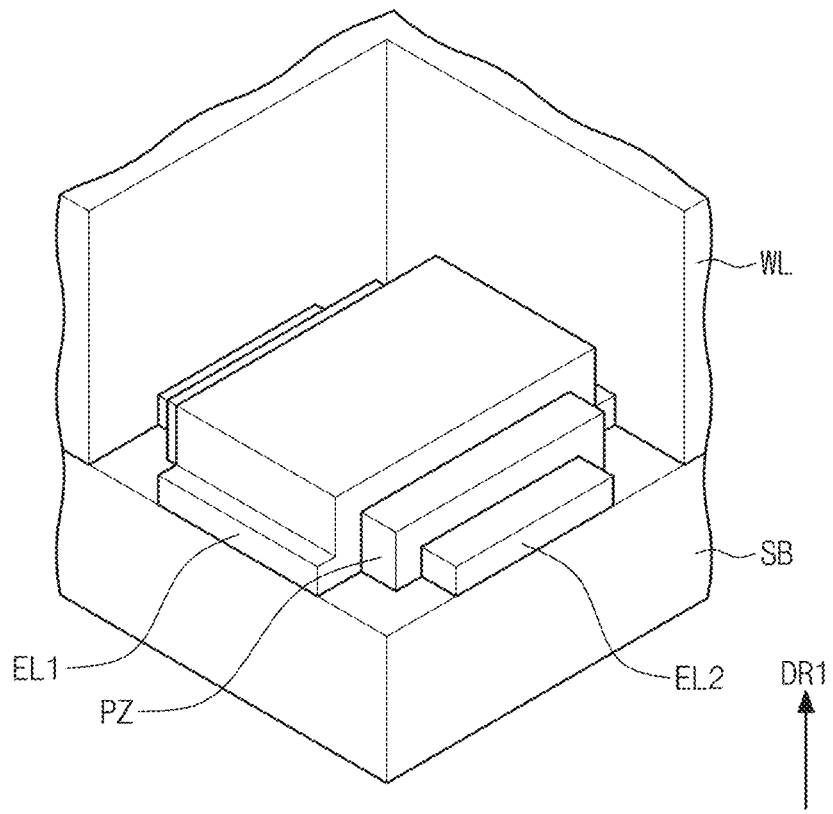

FIGS. 3 to 5 are perspective views illustrating portions of exemplary embodiments of the expressing unit according to the invention.

Referring to FIGS. 2 and 3, an exemplary embodiment of the expressing unit 200 may further include a first electrode EL1 and a second electrode EL2.

The first electrode EL1 and the second electrode EL2 may be disposed on the substrate SB. The first electrode EL1 and the second electrode EL2 may be disposed in each of the active regions AR.

The first electrode EL1 may be connected to one terminal of a corresponding piezoelectric element PZ of the piezoelectric elements PZ. The second electrode EL2 may be connected to another terminal of the corresponding piezoelectric element PZ.

The first electrode EL1 may be disposed on a top surface of the corresponding piezoelectric element PZ. The second electrode EL2 may be opposite to the first electrode EL1 with the corresponding piezoelectric element PZ therebetween. In one exemplary embodiment, for example, the second electrode EL2 may be disposed under the corresponding piezoelectric element PZ.

A first voltage may be applied to the first electrode EL1, and a second voltage may be applied to the second electrode EL2. The volume of the corresponding piezoelectric element PZ connected to the first and second electrode EL1 and EL2 may expand or shrink substantially in the first direction DR1 by a voltage difference between the first voltage and the second voltage.

Referring to FIGS. 2 and 4, an alternative exemplary embodiment of the expressing unit 200 may further include a first electrode EL1 and a second electrode EL2.

The first electrode EL1 and the second electrode EL2 may be disposed on the substrate SB. The first electrode EL1 and the second electrode EL2 may be disposed in each of the active regions AR.

The first electrode EL1 may be connected to one terminal of a corresponding piezoelectric element PZ of the piezoelectric elements PZ. The second electrode EL2 may be connected to another terminal of the corresponding piezoelectric element PZ.

The first electrode EL1 may be disposed at a side of the corresponding piezoelectric element PZ. The second electrode EL2 may be opposite to the first electrode EL1 with the corresponding piezoelectric element PZ therebetween. The second electrode EL2 may be disposed at another side of the corresponding piezoelectric element PZ.

A first voltage may be applied to the first electrode EL1, and a second voltage may be applied to the second electrode EL2. The volume of the corresponding piezoelectric element PZ connected to the first and second electrode EL1 and EL2 may expand or shrink substantially in the first direction DR1 by a voltage difference between the first voltage and the second voltage.

Referring to FIGS. 2 and 5, another alternative exemplary embodiment of the expressing unit 200 may further include a first electrode EL1 and a second electrode EL2.

The first electrode EL1 and the second electrode EL2 may be disposed on the substrate SB. The first electrode EL1 and the second electrode EL2 may extend in different directions from each other. In an exemplary embodiment, the extending directions of the first and second electrodes EL1 and EL2 may be substantially parallel to the top surface of the substrate SB.

The first electrode EL1 may be connected to the piezoelectric elements PZ arranged substantially in a column direction, and the second electrode EL2 may be connected to the piezoelectric elements PZ arranged substantially in a row direction. The piezoelectric elements PZ may be arranged along a plurality of rows substantially parallel to the row direction and a plurality of columns substantially parallel to the column direction. In such an embodiment, a plurality of first electrodes EL1 may be disposed or provided to respectively correspond to the plurality of columns and a plurality of second electrodes EL2 may be provided to respectively correspond to the plurality of rows. The partition wall WL may be disposed on the first electrode EL1 and EL2.

The first electrode EL1 may be connected to one terminal of a corresponding piezoelectric element PZ. The second electrode EL2 may be connected to another terminal of the corresponding piezoelectric element PZ.

The first electrode EL1 may be disposed on a top surface of the piezoelectric element PZ. The second electrode EL2 may be opposite to the first electrode EL1 with the piezoelectric element PZ therebetween. In one exemplary embodiment, for example, the second electrode EL2 may be disposed under the piezoelectric element PZ.

A first voltage may be applied to the first electrode EL1, and a second voltage may be applied to the second electrode EL2. The volume of the piezoelectric element PZ connected to the first and second electrode EL1 and EL2 may expand or shrink substantially in the first direction DR1 by a voltage difference between the first voltage and the second voltage.

However, the invention is not limited to the exemplary embodiments described above with reference to FIGS. 3 to 5. In other exemplary embodiments, the shapes of the piezoelectric element PZ and the first and second electrodes EL1 and EL2 may be variously modified under the condition that the first and second electrodes EL1 and EL2 are respectively connected to one terminal and another terminal of the piezoelectric element PZ. Hereinafter, an exemplary embodiment, in which the first and second electrodes EL1 and EL2 have the shapes shown in FIG. 3, will be described in greater detail for convenience of description.

Figure 6:
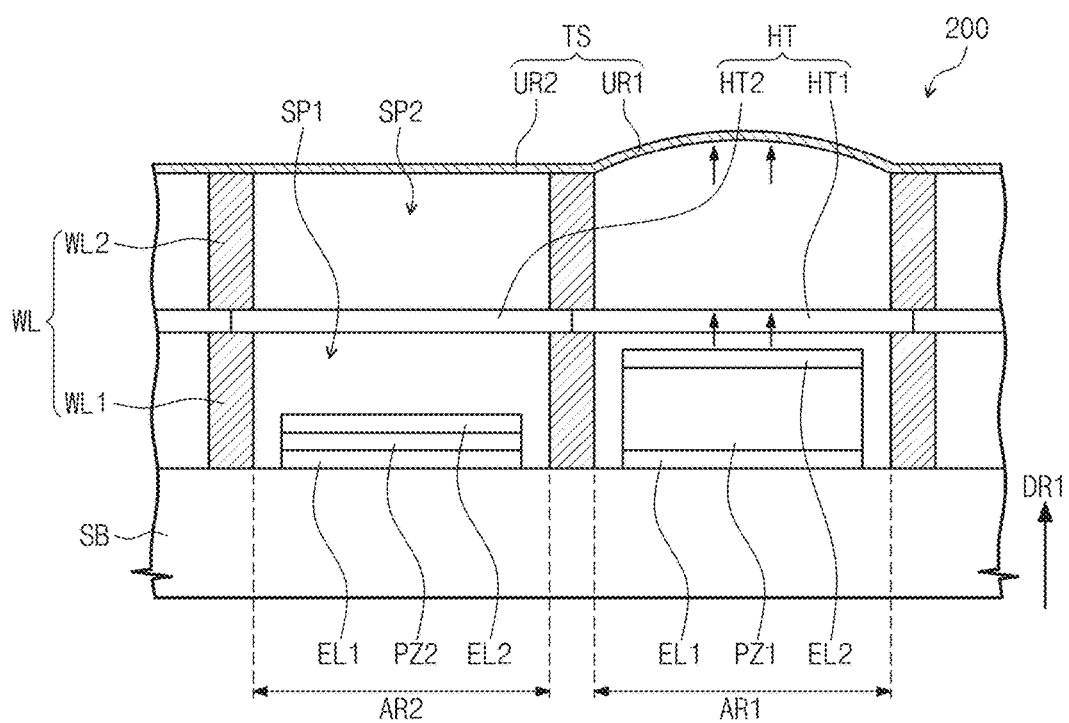
FIG. 6 is a cross-sectional view illustrating an exemplary embodiment of the expressing unit of FIG. 1, according to the invention.

FIG. 6 is a cross-sectional view illustrating an exemplary embodiment of an expressing unit 200 of FIG. 1, according to the invention.

FIG. 6 illustrates two active regions of an exemplary embodiment of an expressing unit 200 including a first active region AR1 and a second active region AR2. FIG. 6 shows an exemplary embodiment of an expressing unit 200 when the first active region AR1 applies pressure to the tactile sensation providing layer TS, and the second active region AR2 does not apply pressure to the tactile sensation providing layer TS.

Referring to FIGS. 2 and 6, an exemplary embodiment of the expressing unit 200 may further include a hydrogen storage alloy HT. The hydrogen storage alloy HT may absorb or release hydrogen based on an applied pressure thereto. In such an embodiment, when the pressure is applied to the hydrogen storage alloy HT, the hydrogen storage alloy HT may release the hydrogen. In such an embodiment, when the pressure is not applied to the hydrogen storage alloy HT, the hydrogen storage alloy may absorb or restore the hydrogen. The release and absorption of the hydrogen of the hydrogen storage alloy HT is reversible.

In such an embodiment, the hydrogen released from the hydrogen storage alloy HT applies pressure to the tactile sensation providing layer TS, and thus, the tactile sensation providing layer TS may protrude.

The hydrogen storage alloy HT may be homogeneous or heterogeneous. In one exemplary embodiment, for example, the hydrogen storage alloy HT may include a magnesium-based hydrogen storage alloy (e.g., $Mg_2Cu$ or $Mg_2Ni$), a rare-earth metal-based hydrogen storage alloy (e.g., $LaNi_5$ or $MnNi_5$), a titanium-based hydrogen storage alloy (e.g., TiFe, TiCo, TiMn, or $TiCr_2$), a zirconium-based hydrogen storage alloy (e.g., $ZrMn_2$), for a combination thereof.

The hydrogen storage alloy HT may have a maximum hydrogen release amount of about $1.4 \times 10^6$ cubic micrometer ($\mu m^3$) per a unit volume of $100 \times 100 \times 10$ $\mu m^3$. Since a resolution of tactile sensation of a person (e.g., a human finger) is generally about 40 μm, the hydrogen storage alloy HT having the unit volume may provide recognizable tactile sensation information to the person.

The expressing unit 200 may include a plurality of hydrogen storage alloys HT. The plurality of hydrogen storage alloys HT may be spaced apart from each other and may correspond to the active regions AR, respectively. The hydrogen storage alloys HT may include a first hydrogen storage alloy HT1 corresponding to the first active region AR1 and a second hydrogen storage alloy HT2 corresponding to the second active region AR2.

The partition wall WL may include a first partition wall WL1 and a second partition wall WL2.

The first partition wall WL1 may be disposed between the substrate SB and the hydrogen storage alloy HT to define a first space SP1 that is sealed.

The second partition wall WL may be disposed between the hydrogen storage alloy HT and the tactile sensation providing layer TS to define a second space SP2 that is sealed.

The fluid FD may be a gas. The fluid FD may include an inert gas and hydrogen. The inert gas may fill the first space SP1. The inert gas may include at least one of 18-group elements and may have very low reactivity. Thus, the inert gas may not generate a compound. The hydrogen may fill the second space SP2 or may be stored in the hydrogen storage alloy HT.

A driving mechanism of the first and second active regions AR1 and AR2 of the expressing unit shown in FIG. 6 will be described hereinafter.

In such an embodiment, different voltages from each other may be applied to the first electrode EL1 and the second electrode EL2 of the first active region AR1, respectively, such that a volume of a piezoelectric element PZ1 of the first active region AR1 may be expanded substantially in the first direction DR1 by a voltage difference between the voltages applied to the first and second electrodes EL1 and EL2.

When the volume of the piezoelectric element PZ1 is expanded, the inert gas in the first space SP1 applies pressure to the first hydrogen storage alloy HT1. The first hydrogen storage alloy HT1 releases hydrogen into the second space SP2 by the pressure of the inert gas, and the hydrogen thereby applies pressure to a corresponding unit region UR1 of the tactile sensation providing layer TS. The unit region UR1 may protrude substantially in the first direction DR1 by the pressure applied by the hydrogen. Users may recognize information expressed by the protruding unit region UR1 through their tactile sensation.

In such an embodiment, voltages equal to each other may be applied to the first electrode EL1 and the second electrode EL2 of the second active region AR2. Since a voltage difference does not occur between the first and second electrodes EL1 and EL2 of the second active region AR2, a volume of a piezoelectric element PZ2 of the second active region AR2 may not be expanded. The inert gas filling the first space SP1 of the second active region AR2 does not apply pressure to the second hydrogen storage alloy HT2, such that the second hydrogen storage alloy HT2 may restore hydrogen in the second space SP2 of the second active region AR2. Accordingly, pressure is not applied to a unit region UR2, which correspond to the second active region AR2, of the tactile sensation providing layer UR2, and thus, the unit region UR2 does not protrude. Users may recognize information expressed by the non-protruding unit region UR2 through their tactile sensation.

Figure 7:
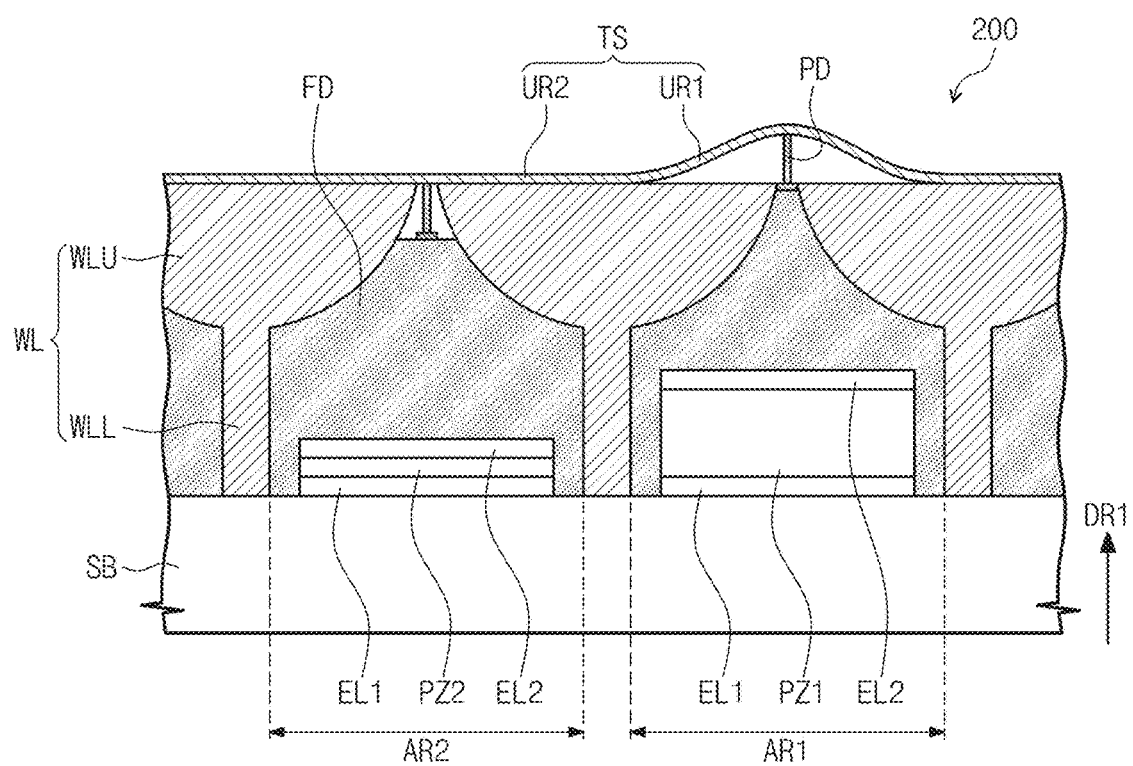
FIG. 7 is a cross-sectional view illustrating an alternative exemplary embodiment of the expressing unit of FIG. 1, according to the invention.

FIG. 7 is a cross-sectional view illustrating an alternative exemplary embodiment of an expressing unit 200 of FIG. 1 according to the invention.

FIG. 7 illustrates two active regions including a first active region AR1 and a second active region AR2 as an example. The first active region AR1 applies pressure to the tactile sensation providing layer TS, and the second active region AR2 does not apply pressure to the tactile sensation providing layer TS.

Referring to FIG. 7, the partition wall WL may include an upper partition wall WLU and a lower partition wall WLL. The lower partition wall WLL may be disposed on the substrate SB. The upper partition wall WLU may be disposed between the lower partition wall WLL and the tactile sensation providing layer TS. The upper partition wall WLU and the lower partition wall WLL may be integrally formed as a single unitary and indivisible unit. However, exemplary embodiments of the invention are not limited thereto. In an alternative exemplary embodiment, the partition wall WL may include only the upper partition wall WLU.

A width of the upper partition wall WLU may become progressively less from a top of the upper partition wall WLU toward of a bottom of the upper partition wall WLU. An area of a region exposed by the top of the upper partition wall WLU may be smaller than an area of a region exposed by the bottom of the upper partition wall WLU when viewed from a plan view.

The fluid FD may be a liquid. In one exemplary embodiment, for example, the fluid FD may be oil. A height of a top surface of the fluid FD may be controlled based on an expansion of the volume of piezoelectric elements PZ1 and PZ2. A maximum height of the top surface of the fluid FD may be substantially equal to or lower than the top of the upper partition wall WLU.

The expressing unit 200 may further include a protrusion PD. The protrusion PD may be disposed between the top surface of the fluid FD and the tactile sensation providing layer TS. The protrusion PD may be moved by the fluid pressure of the fluid FD (e.g., movement of the top surface of the fluid FD), and thus, the tactile sensation providing layer TS may protrude. In an exemplary embodiment, the protrusion PD may include or be formed of a material having a relatively great buoyance.

A driving mechanism of the first and second active regions AR1 and AR2 of the expressing unit shown in FIG. 7 will be described hereinafter.

In such an embodiment, different voltages from each other may be applied to the first electrode EL1 and the second electrode EL2 of the first active region AR1, such that a volume of the piezoelectric element PZ1 of the first active region AR1 may be expanded substantially in the first direction DR1 by a voltage difference between the voltages applied to the first and second electrodes EL1 and EL2. When the volume of the piezoelectric element PZ1 is expanded, the height of the top surface of the fluid FD ascends and the protrusion PD applies pressure to a corresponding unit region UR1 of the tactile sensation providing layer TS. Accordingly, the unit region UR1 may protrude substantially in the first direction DR1 by the pressure applied by fluid FD and the protrusion PD. Users may recognize information expressed by the protruding unit region UR1 through their tactile sensation.

In such an embodiment, voltages equal to each other may be applied to the first electrode EL1 and the second electrode EL2 of the second active region AR2. Since a voltage difference does not occur between the first and second electrodes EL1 and EL2 of the second active region AR2, a volume of the piezoelectric element PZ2 of the second active region AR2 may not be expanded. Accordingly, the height of the top surface of the fluid FD may be maintained. In an alternative exemplary embodiment, when voltages equal to each other may be applied to the first electrode EL1 and the second electrode EL2 of the second active region AR2, an expanded piezoelectric element PZ2 may shrink, and the height of the top surface of the fluid FD may descend. In such an embodiment, a top of the protrusion PD may be disposed to be equal to or lower than the top surface of the upper partition wall WLU. Thus, pressure is not applied to the unit region UR2, which correspond to the second active region AR2, of the tactile sensation providing layer UR2. As a result, the unit region UR2 does not protrude. Users may recognize information expressed by the non-protruding unit region UR2 through their tactile sensation.

Figure 8:
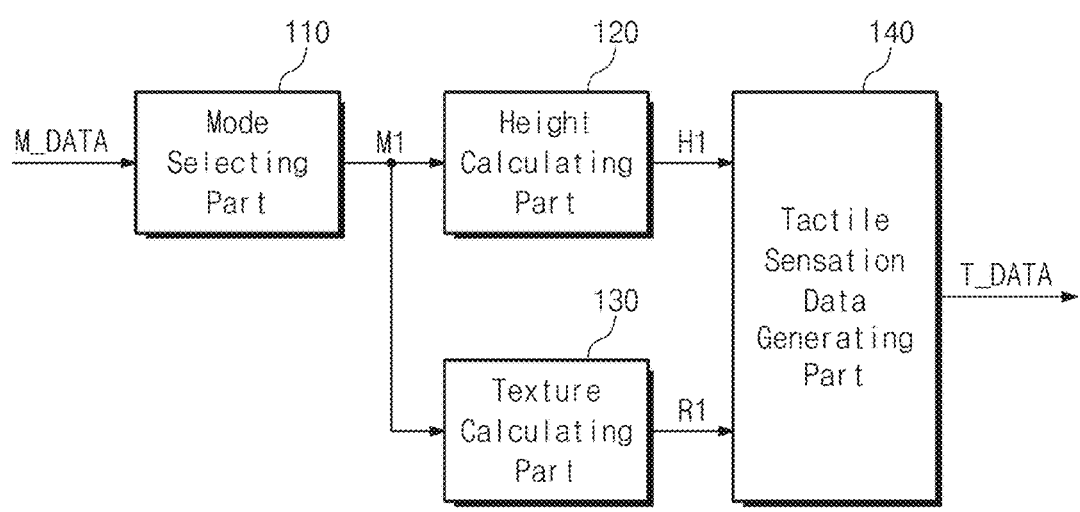
FIG. 8 is a schematic block diagram illustrating an exemplary embodiment of a driving unit of FIG. 1.

FIG. 8 is a schematic block diagram illustrating an exemplary embodiment of the driving unit 100 of FIG. 1.

Referring to FIG. 8, the driving unit 100 may include a mode selecting part 110, a height calculating part 120, a texture calculating part 130 and a tactile sensation data generating part 140.

The mode selecting part 110 receives the image data M_DATA from an external system. The mode selecting part 110 selects at least one of shape information, color information and gradation information, which are included in the image data M_DATA.

When the expressing unit 200 provides the tactile sensation information to the user, the same information as the information included in the image data M_DATA is not provided to the user. When the mode selecting part 110 selects the shape information of the image data M_DATA, the tactile sensation data generating part 140 may generate tactile sensation data T_DATA with respect to the shape information and may output the generated tactile sensation data T_DATA to the expressing unit 200. The user may recognize the tactile sensation information corresponding to the tactile sensation data T_DATA. In an exemplary embodiment, as described above, the expressing unit 200 may provide the tactile sensation information using the height or the texture of the tactile sensation providing layer TS.

Figure 9:
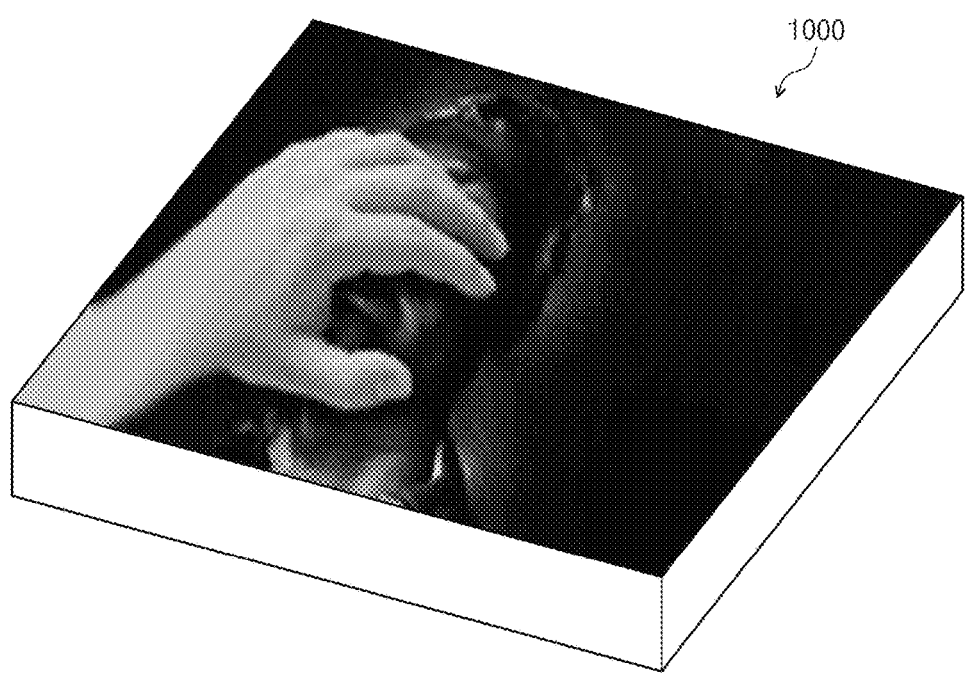
FIG. 9 is a diagram illustrating an exemplary embodiment of an electronic device on which a face shape of a person is expressed.

FIG. 9 is a diagram illustrating an exemplary embodiment of an electronic device 1000 on which a face shape of a person is expressed.

Referring to FIGS. 8 and 9, when the image data M_DATA has image data of a face shape of a person and the mode selecting part 110 selects the shape information of the image data M_DATA, the expressing unit 200 may express a stereoscopic face shape of the person. The user recognizes eye, nose and mouth shapes and roughness of the skin which are expressed on the expressing unit 200 through the tactile sensation. As a result, the user may recognize the stereoscopic face shape of the person expressed on the expressing unit 200.

Referring again to FIG. 8, when the mode selecting part 110 selects the color information or the gradation information of the image data M_DATA, the expressing unit 200 may express the color information or the gradation information and the user may recognize the color or gradation information expressed on the expressing unit 200. In an exemplary embodiment, the expressing unit 200 may express the color or gradation information through the height or texture of the tactile sensation providing layer TS.

Figure 10:
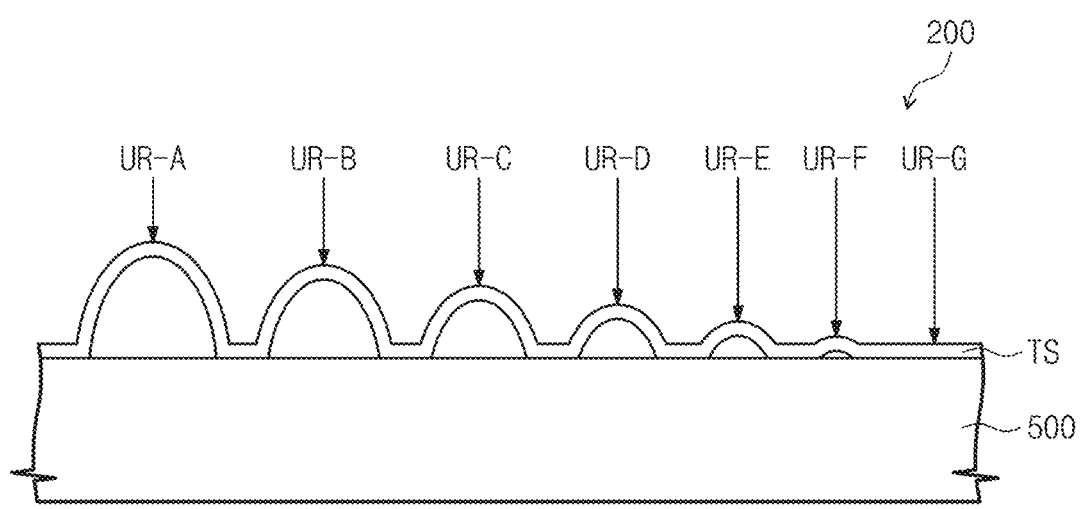
FIG. 10 is a cross-sectional view illustrating an exemplary embodiment of an expressing unit that expresses a color and a gradation based on a height of a tactile sensation providing layer.

FIG. 10 is a cross-sectional view illustrating an exemplary embodiment of an expressing unit which expresses a color and a gradation based on a height of a tactile sensation providing layer.

In FIG. 10, other elements, except the tactile sensation providing layer TS, of the expressing unit 200 are simplified as an expression substrate 500, for convenience of illustration.

Referring to FIGS. 8 and 10, in an exemplary embodiment, a unit region UR-A having the maximum height of the tactile sensation providing layer TS may be defined as a unit region expressing a red color, and a unit region UR-G having the minimum height of the tactile sensation providing layer TS may be defined as a unit region expressing a blue color. In such an embodiment, the unit region UR-G having the minimum height of the tactile sensation providing layer TS may be a non-protruding unit region. In such an embodiment, unit regions UR-B to UR-F having heights between the maximum height and the minimum height may be defined as unit regions expressing colors between the red color and the blue color in a color coordinate. The user may sense the heights of the tactile sensation providing layer TS through the tactile sensation of the user to recognize the color. In FIG. 10, the user may recognize the color changed from the red color to the blue color as a touch position is moved from the left to the right of FIG. 10.

In such an alternative exemplary embodiment, the unit region UR-A having the maximum height of the tactile sensation providing layer TS may be defined as a unit region expressing a white gradation, and the unit region UR-G (e.g., the non-protruding unit region) having the minimum height of the tactile sensation providing layer TS may be defined as a unit region expressing a black gradation. In such an embodiment, unit regions UR-B to UR-F having heights between the maximum height and the minimum height may be defined as unit regions expressing gradations between the white gradation and the black gradation. The user may sense the heights of the tactile sensation providing layer TS through the tactile sensation of the user to recognize the gradation. In FIG. 10, the user may recognize the gradation changed from the white gradation to the black gradation as a touch position is moved from the left to the right of FIG. 10.

FIGS. 11A to 11C are plan views illustrating an exemplary embodiment of an expressing unit that expresses a color and a gradation based on a texture of a tactile sensation providing layer.

FIGS. 11A to 11C illustrate unit regions UR-A to UR-I of the tactile sensation providing layer TS which are arranged in a 3×3 matrix form. In FIGS. 11A to 11C, unit regions in which a reference designator "O" is expressed are defined as protruding unit regions, and unit regions in which the reference designator "O" is not expressed are defined as non-protruding unit regions. Protruding heights of the unit regions expressed by the reference designator "O" may be substantially equal to each other.

In FIG. 11A, when a density of the protruding unit regions is high, the user may recognize a rough texture through the tactile sensation. In FIG. 11C, a density of the protruding unit regions is low, and thus, the user may recognize a smooth texture through the tactile sensation. In FIG. 11B, the user may recognize a texture having a roughness between the roughness of FIG. 11A and the roughness of FIG. 11C.

Referring to FIGS. 8 and 11A to 11C, in an exemplary embodiment, the protruding regions having the maximum density may be defined as expressing a red color, and the protruding regions having the minimum density may be defined as expressing a blue color. In such an embodiment, the protruding regions having a density between the maximum density and the minimum density may be defined as expressing a color between the red color and the blue color. The user may sense a roughness of the tactile sensation providing layer TS through the tactile sensation to recognize the color. The user may recognize the color changed from the red color to the blue color as the user senses from the unit regions of FIG. 11A to the unit regions of FIG. 11C.

In an alternative exemplary embodiment, the protruding regions having the maximum density may be defined as expressing the white gradation, and the protruding regions having the minimum density may be defined as expressing the black gradation. In such an embodiment, the protruding regions having a density between the maximum density and the minimum density may be defined as expressing a gradation between the white gradation and the black gradation. The user may sense the roughness of the tactile sensation providing layer TS through the tactile sensation to recognize the gradation. The user may recognize the gradation changed from the white gradation to the black gradation as the user senses from the unit regions of FIG. 11A to the unit regions of FIG. 11C.

Referring to FIGS. 2 and 8, the height calculating part 120 receives the information M1 selected from the mode selecting part 110. The height calculating part 120 may determine heights of the unit regions UR of the tactile sensation providing layer TS respectively corresponding to the active region AR on the basis of the selected information M1. The height calculating part 120 may output a first signal H1 that includes data indicating the determined heights of the unit regions UR.

The texture calculating part 130 receives the information M1 selected from the mode selecting part 110. The texture calculating part 130 may determine a texture of the tactile sensation providing layer TS based on the selected information M1. The texture calculating part 130 may determine the number of protruding unit regions among a predetermined number of the unit regions. The texture calculating part 130 may output a second signal R1 that includes data indicating the number of protruding unit regions among the predetermined number of unit regions.

The tactile sensation data generating part 140 receives the first signal H1 and the second signal R1. The tactile sensation data generating part 140 the tactile sensation data T_DATA based on the height and the texture of the tactile sensation providing layer TS. The tactile sensation data generating part 140 outputs the tactile sensation data T_DATA to the expressing unit 200 of FIG. 1.

Figure 12:
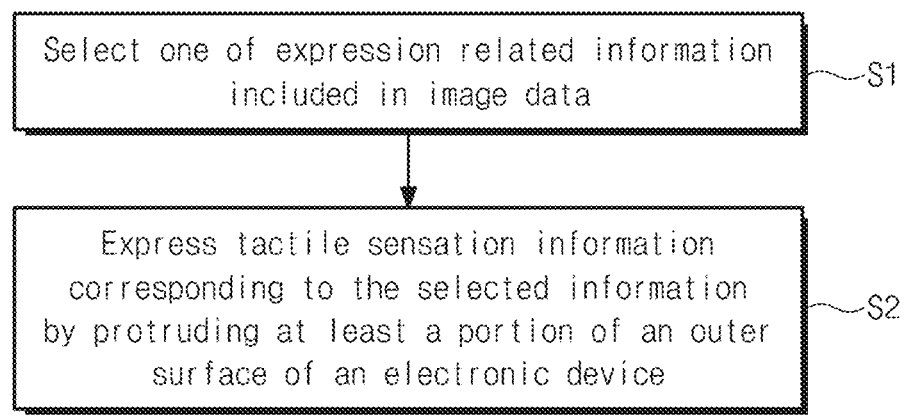
FIG. 12 is a flowchart illustrating an exemplary embodiment of a method for providing information of an electronic device.

FIG. 12 is a flowchart illustrating an exemplary embodiment of a method for providing information of an electronic device.

Referring to FIGS. 2 and 12, an exemplary embodiment of a method for providing the information of the electronic device includes selecting one of expression related information included in image data (S1) and expressing tactile sensation information corresponding to the selected information by protruding at least a portion of an outer surface of an electronic device (S2).

The information included in the image data may include shape information, color information and gradation information.

The tactile sensation providing layer TS of the expressing unit 200, as shown in FIG. 2, may include a plurality of unit regions UR, and the unit regions UR may protrude by the piezoelectric elements PZ and the fluid FD.

In such an embodiment, the tactile sensation information may be expressed using heights of the unit regions UR and the number of the protruding unit regions among the plurality of unit regions.

An exemplary embodiment of the expressing unit 200 may express the shape, color or gradation information as described with reference to FIGS. 8 to 11. In such an embodiment, the user may recognize the shape, color or gradation information as described with reference to FIGS. 8 to 11.

According to exemplary embodiments of the invention, as described herein, the electronic device may express the tactile sensation information and the user may recognize the expressed information through the tactile sensation.

The tactile sensation information corresponding to the shape, color or gradation information of the image data may be expressed by an exemplary embodiment of the method for providing the information of the electronic device described above, according to the invention.

While the invention have been described with reference to example embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. An electronic device comprising:
   a pressure provider which generates an initial pressure in response to an electrical signal;
   a fluid material which generates fluidic pressure corresponding to the initial pressure in each of active regions partitioned from each other;
   a tactile sensation providing layer configured to protrude by the fluidic pressure;
   a hydrogen storage alloy which absorbs or releases hydrogen according to pressure applied thereto; and
   a partition wall disposed on a substrate and defining the active regions, and which comprises:
      a first partition wall disposed between the substrate and the hydrogen storage alloy to form a first space that is sealed; and
      a second partition wall disposed between the hydrogen storage alloy and the tactile sensation providing layer to form a second space that is sealed.

2. The electronic device of claim 1, wherein the pressure provider comprises a plurality of piezoelectric elements disposed in the active regions, and
   each of the piezoelectric elements is mechanically modified by the electrical signal.

3. The electronic device of claim 2, further comprising a first electrode connected to one terminal of each of the piezoelectric elements, and a second electrode connected to another terminal of each of the piezoelectric elements.

4. The electronic device of claim 3, wherein the first electrode is disposed on a top surface of each of the piezoelectric elements, and
   wherein the second electrode is disposed opposite to the first electrode with each of the piezoelectric elements therebetween.

5. The electronic device of claim 3, wherein the first electrode is disposed at a side of each of the piezoelectric elements,
   wherein the second electrode is disposed at another side of each of the piezoelectric elements, and
   wherein each of the piezoelectric elements is disposed between the first electrode and the second electrode.

6. The electronic device of claim 2, wherein the piezoelectric elements are comprised of aluminum orthophosphate ($AlPO_4$), quartz, Rochelle salt, topaz, gallium orthophosphate ($GaPO_4$), lanthanum-gallium silicate ($La_3Ga_5SiO_{14}$), barium titanate ($BaTiO_3$), bismuth titanate ($Bi_4Ti_3O_{12}$), lead titanate ($PbTiO_3$), zinc oxide ($ZnO$), zirconium-lead titanate ($Pb[Zr_xTi_{1-x}]O_3$, $0<x<1$; PZT), lanthanum-bismuth titanate ($[Bi_{4-x}La_x]Ti_3O_{12}$, $0<x<1$; BLT), tin oxide ($SnO_2$), potassium niobate ($KNbO_3$), lithium niobate ($LiNbO_3$), lithium tantalate ($LiTaO_3$), sodium tungstate ($Na_2WO_3$), sodium-barium niobate ($Ba_2NaNb_5O_5$), potassium-lead niobate ($Pb_2KNb_5O_{15}$), sodium-potassium niobate ($KNaNb_5O_5$), bismuth ferrite ($BiFeO_3$) or a combination thereof.

7. The electronic device of claim 1, wherein the hydrogen storage alloy are comprised of a magnesium-based hydrogen storage alloy of $Mg_2Cu$ or $Mg_2Ni$, a rare-earth metal-based hydrogen storage alloy of $LaNi_5$ or $MnNi_5$, a titanium-based hydrogen storage alloy of TiFe, TiCo, TiMn, or $TiCr_2$, a zirconium-based hydrogen storage alloy of $ZrMn_2$ or a combination thereof.

8. The electronic device of claim 1, wherein the fluid comprises:
   an inert gas which fills the first space;
   hydrogen which fills the second space or is stored in the hydrogen storage alloy.

9. The electronic device of claim 8, wherein the inert gas applies a pressure to the hydrogen storage alloy by volume variation of the piezoelectric element,
   wherein the hydrogen storage alloy releases the hydrogen by the pressure of the inert gas, and
   wherein the hydrogen applies a pressure to the tactile sensation providing layer.

10. The electronic device of claim 1, further comprising a driving unit which receives image data, converts the image data into tactile sensation data, and outputs the tactile sensation data to an expressing unit, wherein the expressing unit expresses tactile sensation information corresponding to the tactile sensation data, and comprises the pressure providing part, the fluid, and the tactile sensation providing layer.

11. The electronic device of claim 10, wherein the driving unit comprises a mode selecting part which selects at least one of shape information, color information, or gradation information which is included in the image data.

12. The electronic device of claim 11, wherein the driving unit further comprises:
 a height calculator which determines heights of regional elements, respectively corresponding to the active regions, of the tactile sensation providing layer;
 a texture calculator which determines a number of protruding regional elements among the regional elements of the tactile sensation providing layer to determine a texture of the tactile sensation providing layer; and
 a tactile sensation data generator which generates the tactile sensation data on the basis of the heights and the texture of the tactile sensation providing layer.

13. A method for providing information on an electronic device, the method comprising:
 selecting at least one of shape information, color information, or gradation information included in image data; and
 expressing tactile sensation information corresponding to the selected information by protruding at least a portion of an outer surface of the electronic device,
 wherein expressing the tactile sensation information comprises expressing the tactile sensation information by protruding a predetermined number of regional elements among a plurality of regional elements, calculated on the basis of density information defined as expressing the color information or the gradation information if selecting at least of one of the shape information, the color information, or the gradation information is selecting the color information or the gradation information.

14. The method of claim 13, wherein the electronic device comprises the plurality of regional elements protruded by signals applied thereto,
 wherein expressing the tactile sensation information comprises expressing the tactile sensation information further using heights of the regional elements.

15. An electronic device comprising:
 a pressure provider which generates an initial pressure in response to an electrical signal;
 a fluid material which generates fluidic pressure corresponding to the initial pressure in each of active regions partitioned from each other;
 a tactile sensation providing layer configured to protrude by the fluidic pressure; and
 a protrusion disposed between a surface of the fluid material and the tactile sensation providing layer,
 wherein the protrusion floats on the fluid material and is moved by the fluidic pressure to protrude the tactile sensation providing layer.

16. The electronic device of claim 15, wherein the pressure provider comprises a plurality of piezoelectric elements disposed in the active regions, and
 each of the piezoelectric elements is mechanically modified by the electrical signal.

17. The electronic device of claim 15, wherein the fluid material is a liquid.

18. The electronic device of claim 15, further comprising a partition wall disposed on a substrate and defining the active regions,
 wherein the partition wall comprises a region of which a width becomes progressively smaller toward a bottom of the region.

19. The electronic device of claim 18, wherein an area of a region exposed by a top of the partition wall is smaller than an area of a region exposed by the bottom of the partition wall when viewed from a plan view.

* * * * *